Nov. 12, 1940.                S. QUISLING                2,221,411
                           SEPARABLE FASTENER
                  Original Filed April 14, 1937    3 Sheets-Sheet 1
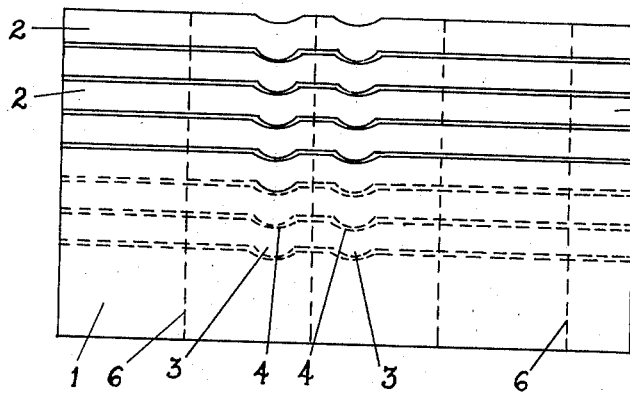
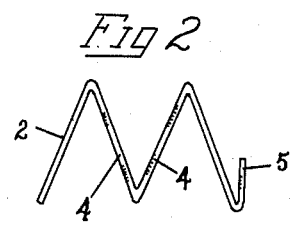
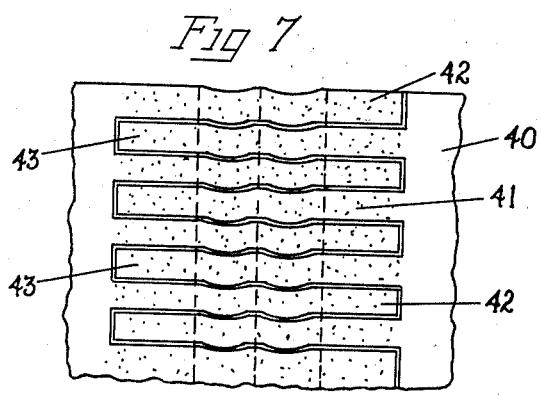
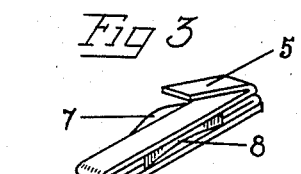
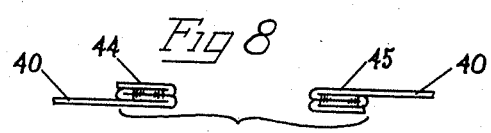
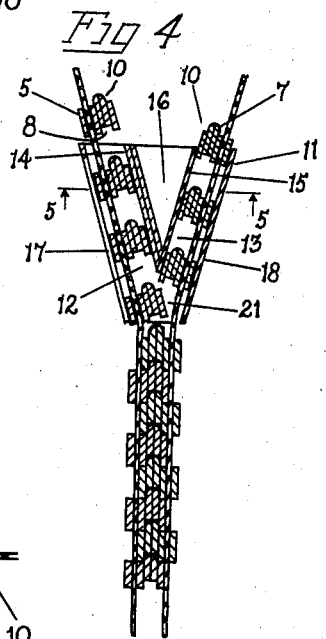
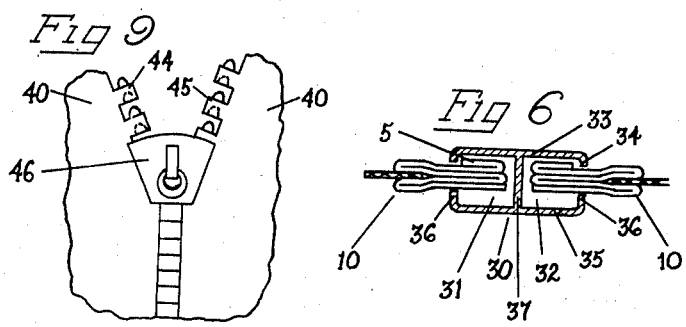
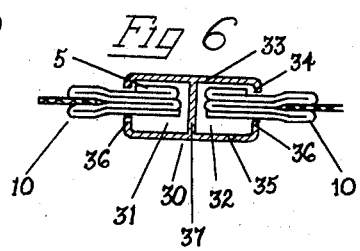
INVENTOR.
Sverre Quisling
BY George F. Mueller
ATTORNEY.

Nov. 12, 1940.   S. QUISLING   2,221,411
SEPARABLE FASTENER
Original Filed April 14, 1937   3 Sheets-Sheet 2
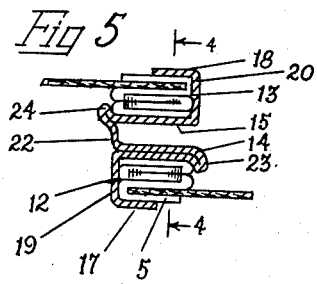
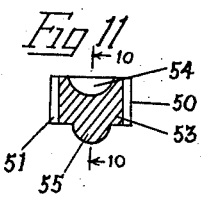
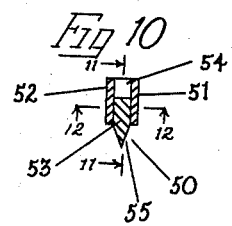
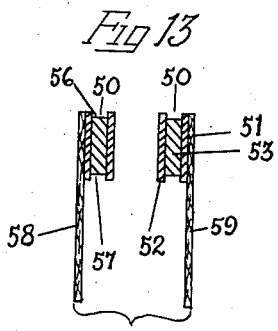
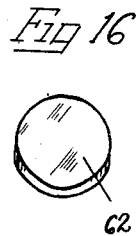
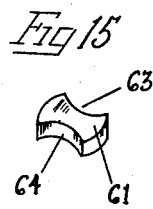
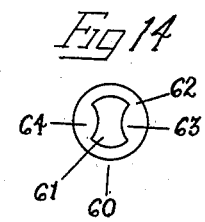
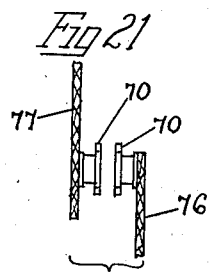
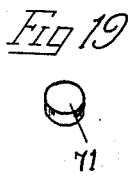
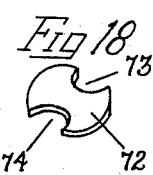
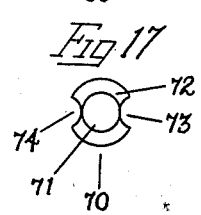
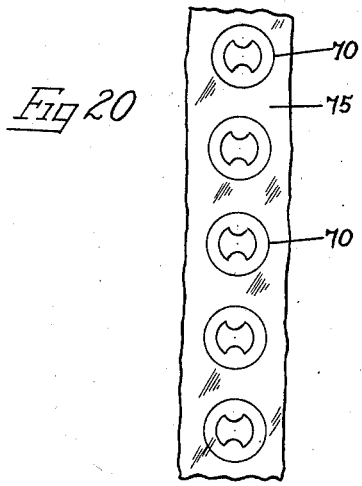
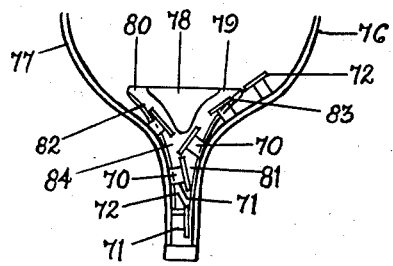
INVENTOR.
Sverre Quisling
BY George F. Mueller
ATTORNEY.

Nov. 12, 1940.    S. QUISLING    2,221,411
SEPARABLE FASTENER
Original Filed April 14, 1937    3 Sheets-Sheet 3
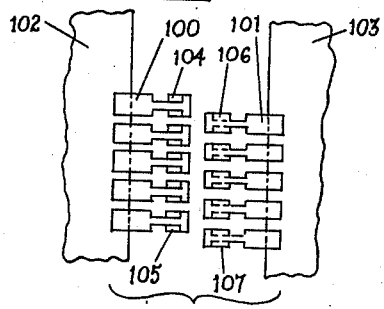
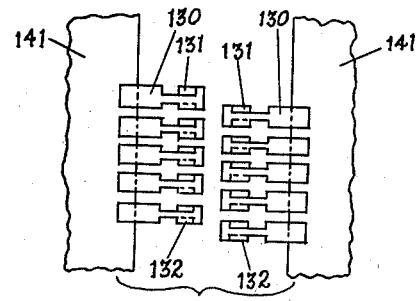
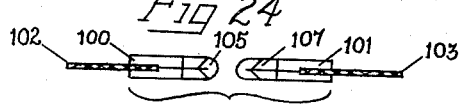
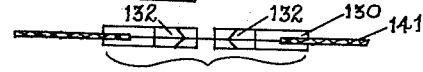
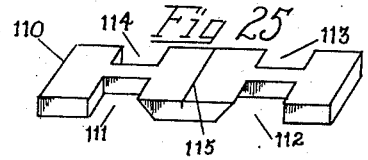
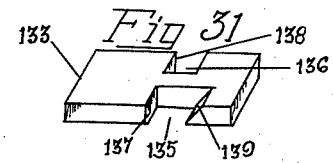
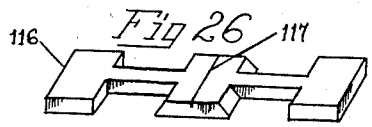
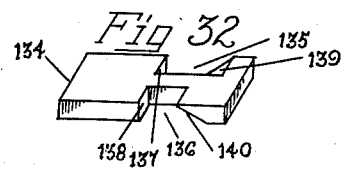
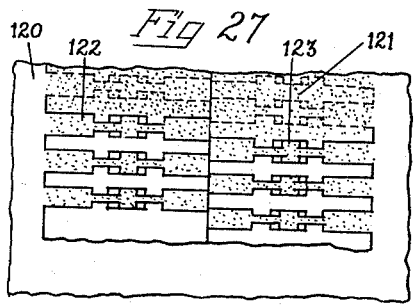
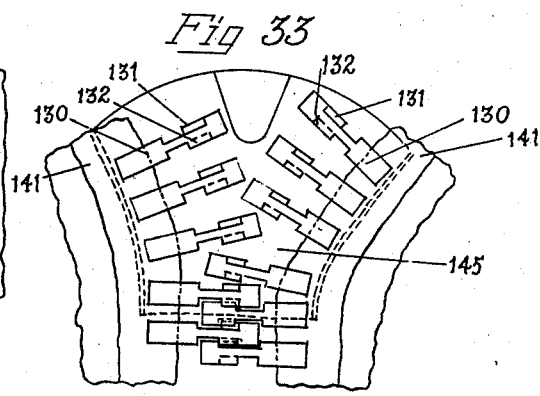
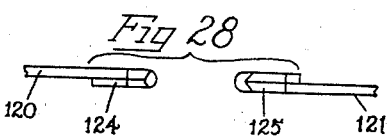
INVENTOR.
Sverre Quisling
BY George F. Mueller
ATTORNEY.

Patented Nov. 12, 1940

2,221,411

UNITED STATES PATENT OFFICE 2,221,411

SEPARABLE FASTENER

Sverre Quisling, Madison, Wis., assignor to Talon, Inc., Meadville, Pa., a corporation of Pennsylvania Application April 14, 1937, Serial No. 136,753
Renewed March 30, 1940

2 Claims. (Cl. 24—205)

This invention relates to separable fasteners, and more particularly to that class of separable fasteners which comprise opposed series of interdigitating fastener elements secured to opposing free edges of a closure and adapted to be interlocked and disengaged progressively by means of a slider.

My invention provides improved fastener elements which are simple in construction, inexpensive to manufacture and easy to operate.

My invention further provides fastener elements which permit the use of less complicated machinery in the manufacture of the elements and a greater speed of production than present practice.

My invention further provides fastener elements which can be made with smooth or rounded edges so that these elements may be used safely on undergarments worn next to the skin, such as corsets and the like.

My invention further provides a separable fastener having greater flexibility and strength than fasteners now in use.

My invention also provides an improved construction for fastener elements which permits the use of plastic materials as well as metal.

My invention also provides fastener elements which permit progressive interlocking and disengagement of the elements without the use of a slider.

My invention also provides fastener elements which permit the application of the elements to the surface of overlapping edges of a closure as well as to the abutting edges of a closure.

Plastic materials have been used for fastener elements, but the only plastics which have been practicable are those which will not withstand boiling water and/or solvents or cleaning fluids. Hence, it is difficult to clean the materials upon which these plastic elements have been used. My invention, because of its simplicity permits the use of a great variety of materials, including such plastic materials as will withstand almost any type of treatment. Because of the possibility of the use of this great variety of materials, it is possible to make my fastener elements of any desired color so as to match the color of the closure material upon which they are secured. The use of plastic materials permits the production of fastener elements of less weight than metal elements.

I have found that I may form fastener elements from sheet material by cutting suitably shaped blanks from the sheet material and superimposing the blanks to build up individual elements. The blanks may be cut to such a shape so that the individual elements are formed by folding the blank upon itself one or more times. The plies, either the individual blanks or the folds of the folded blanks, are laminated and maintained in fixed relation to form a unitary structure by bonding or coalescing the adjacent contacting surfaces. Bonding of the contacting surfaces may be accomplished by any suitable method or means, such as by an actual fusion of the contacting surfaces, by the fusion of a coating which is adherent to the contacting surfaces, by the fusion of a material compatible with the contacting surfaces and placed between the surfaces in the laminating process, by the use of an adhesive coating on one or both of the contacting surfaces, by the use of an adhesive material placed between the surfaces in the laminating process, and the like.

Any desired sheet material may be used in the construction of my fastener elements, such as metal, cellulose acetate, cellulose nitrate, furfural condensation products, vinyl resins, phenolic condensation products, formaldehyde condensation products, glass, and the like, or fabric, pulp or paper sheets impregnated with a plastic. To simplify the description and claims, I shall refer to these materials as a class and shall designate this class "foundation materials".

Other advantages will become apparent from the following detailed description which is to be considered in conjunction with the accompanying drawings, wherein:

Fig. 1 is a top plan view of a sheet of foundation material, indicating the lines for cutting it into fastener element blanks, a portion of the foundation material being cut into blanks;

Fig. 2 is a side view of a fastener element blank at the beginning of the folding operation;

Fig. 3 is a perspective view of the completed fastener element of Fig. 2;

Fig. 4 is a sectional view, on line 4—4 of Fig. 5, illustrating the fastener elements of Fig. 3 secured to the faces of overlapping edges of the closure material and a slider;

Fig. 5 is a sectional view of the closure and slider on line 5—5 of Fig. 4;

Fig. 6 is a transverse sectional view of a closure and slider illustrating the fastener elements of Fig. 3 secured to the abutting edges of the closure material;

Fig. 7 is a top plan view of a portion of flexible closure material impregnated with a plastic material to form foundation material, a portion of the foundation material being cut into fastener element blanks;

Fig. 8 is an end view of Fig. 7 illustrating the completed fastener elements;

Fig. 9 is a plan view illustrating a slide interlocking the fastener elements illustrated in Figs. 7 and 8;

Fig. 10 is a sectional view of a further embodiment of a fastener element made according to my invention on line 10—10 of Fig. 11;

Fig. 11 is a sectional view of the fastener element of Fig. 10 on line 11—11 thereof;

Fig. 12 is a sectional view of the fastener element of Fig. 10 on line 12—12 thereof;

Fig. 13 is an end view of a closure embodying the fastener elements of Fig. 10;

Fig. 14 is a bottom view of a further embodiment of a fastener element made according to my invention;

Figs. 15 and 16 are perspective views of the blanks used in the manufacture of the fastener elements of Fig. 14;

Fig. 17 is a bottom view of a further embodiment of a fastener element made according to my invention;

Figs. 18 and 19 are perspective views of the blanks used in the manufacture of the fastener elements of Fig. 17;

Fig. 20 is a bottom view illustrating the fastener elements of Fig. 17 secured to a tape;

Fig 21 is an end view of a closure illustrating the fastener elements of Fig. 17 secured to the faces of overlapping edges of the closure material;

Fig. 22 is a plan view of a closure embodying the fastener elements of Fig. 17 illustrating a form of slider to progressively interlock and disengage the fastener elements;

Fig. 23 is a plan view of a further embodiment of fastener elements made according to my invention, illustrating the fastener elements secured to the edges of the closure material;

Fig. 24 is an end view of the closure illustrated in Fig. 23;

Figs. 25 and 26 are enlarged perspective views of the blanks used to form the fastener elements of Figs. 23 and 24;

Fig. 27 is a plan view of a portion of flexible closure material impregnated with a plastic material to form foundation material, a portion of the foundation material being cut into fastener element blanks similar to the blanks of Figs. 25 and 26;

Fig. 28 is an end view of Fig. 27 illustrating the completed fastener elements;

Fig. 29 is a plan view of a modification of the fastener elements of Fig. 23, illustrating the fastener elements secured to the edges of the closure material;

Fig. 30 is an end view of the closure of Fig. 29;

Figs. 31 and 32 are enlarged perspective views of the blanks used to form the fastener elements of Fig. 29; and, Fig. 33 is an enlarged plan view of a closure embodying the use of the fastener elements of Fig. 29, illustrating a slider, partially broken away.

Referring to the embodiment of my invention illustrated in Figs. 1 through 6, the fastener elements are made by cutting suitably shaped blanks 2 from a sheet of foundation material 1 and folding the blank upon itself.

It is apparent that in the use of certain of the plastic materials, it is imperative that the proper state or form of these materials is used for the foundation material so that the blanks may be folded and laminated and bonded. For example, the phenol-formaldehyde condensation product known to the trade under the trade-mark "Bakelite", may be obtained in three states; state A is soluble in various solvents and may be ocnverted into states B or C by heat and a solution may be used to impregnate various materials, state B is insoluble, but swells when treated with various solvents and may be worked and formed and may be converted into state C by heat and, state C is unaffected by either solvents or heat. If the foundation material is to consist of a fabric impregnated with this type of plastic, obviously, a solution of state A must be used as the impregnating agent.

For illustrative purposes, I shall refer to foundation material 1 as consisting of a textile fabric impregnated with a solution of a plastic material of the phenol-formaldehyde type in state A. Impregnation of the textile fabric with this type and state of the plastic leaves the foundation material 1 in a stiffened but somewhat flexible condition, and permits a blank, cut therefrom, to be formed into any desired shape before the plastic material is converted into state B or state C by the application of heat and pressure.

Blanks 2 are cut from foundation material 1 as indicated in Fig. 1, and are of substantially uniform width throughout their lengths. Blanks 2 are provided with a pair of outwardly projecting tongues 3 along one longitudinal edge and a pair of complementary recesses 4 in the opposite longitudinal edge. Recesses 4 are preferably of slightly greater width than that of tongues 3, for purposes to be hereinafter discussed. The blanks are then folded into a substantially M-shape having an integral flange 5, as shown in Fig. 2. The four legs of the M-shaped member are then brought together to superimpose them. The adjacent contacting surfaces are then bonded by the application of heat and pressure to form a completed fastener element. Assuming that the foundation material consists of textile fabric impregnated with a phenol-formaldehyde condensation product in state A, the bonding operation may convert the condensation product into state B. The final conversion to state C may be accomplished when the fastener element is secured to the closure material. However, it is not, in all cases, essential that the plastic be converted from state B to state C. Foundation material 1 may be scored, as indicated by the vertical broken lines 6 in Fig. 1, to aid in accurate folding of the blanks in the formation of the fastener elements. Flange 5 serves as a means for securing fastener elements to the faces of overlapping edges of the closure, as shown in Fig. 5, and as a guide means for the slider used to interlock and disengage the fastener elements, as shown in Figs. 5 and 6.

In the completed fastener elements, tongues 3 of the adjacent center folds or plies form a single fastener tongue 7 and the registering recesses 4 form a single fastener recess 8. I prefer to form the fastener element with the recess 8 slightly larger than tongue 7 to allow some flexibility of the closure. If desired, in cutting blanks 2 from foundation material 1, the tongue or the tongue and recess may be cut at a suitable angle so that the extremity of the tongue is of less thickness than its base and the apex of the recess is of less thickness than its base. The tongue may be flattened slightly at the extremity during the pressing operation. Either of these methods will produce a joint between adjacent opposed interlocked elements having a ball and socket effect and permit the production of a closure having greater flexibility.

Fastener elements 10 may be secured to the face of overlapping edges of the closure material by inserting the edge of the closure material between the body of elements 10 and flange 5 and then pressing the flange to securely clamp the fabric, as shown in Fig. 5. Assuming again that fastener element 10 consists of textile fabric impregnated with a phenol-formaldehyde condensation product in state A and that fastener element 10 has been formed into the shape illustrated in Fig. 2 and that the plastic has been converted into state B, sufficient heat and pressure is applied to cause some of the plastic to permeate the closure material and to convert the plastic into state C. Fastener elements 10 are thereby permanently secured to the closure material. If desired, flange 5 may be omitted and fastener elements 10 secured to the closure material in a similar manner.

If it is desired to use metal as the foundation material, I prefer to coat the metal with a low melting point metal or alloy which will bond at a temperature which is not harmful to the closure material. It is apparent that the fastener element is formed in the same manner as described hereinbefore and that the bonding of the coating will maintain the folds or plies in fixed or closed relation. The only difference being in the manner in which the fastener elements are secured to the closure material.

I have found that I may use a solution of cellulose acetate to impregnate a fabric or paper material to form the foundation material. The formed fastener elements are secured to the edges of the closure material by saturating the edge of the closure material with a suitable solvent, for example, acetone, and pressing the fastener elements to the closure material. On evaporation of the solvent, it is found that a small amount of the cellulose acetate of the foundation material, in contact with the saturated closure material, has been dissolved and has migrated or permeated into the closure material, thereby bonding together the fastener element and the closure material. Cellulose nitrate and vinyl resin plastics may be employed in a similar manner. Sheets of these materials have also been employed in a similar manner.

I have found that in the use of plastics, such as the phenol-formaldehyde condensation product known as "Bakelite", I may use as the foundation material a sheet of this material in state B. To bond the folds or plies, I insert a thin sheet of fabric or paper impregnated with state A of the plastic between the plies prior to the application of heat and pressure. The plastic contained on and in the fabric or paper is compatible with the foundation material and bonds with the foundation material on the application of heat and pressure. This permits the production of recesses without resulting in a flow of the material into the recess during the application of heat and pressure. Similarly, in securing the fastener elements to the closure material, a thin sheet of fabric or paper, impregnated with the plastic in state A, is inserted between the closure material and the fastener element prior to the application of heat and pressure.

The free edges of a garment or closure or two stringers, adapted to be secured to such free edges, are each provided with a series of spaced fastener elements 10. The free edges are brought together and the fastener elements interlocked progressively or are separated and the fastener elements disengaged progressively by means of a slider 11. In the interlocked position of fastener elements 10, tongue 7 of one of the elements on one stringer fits within the complementary recess 8 of an adjacent element on the opposing stringer.

Slider 11 is employed to effect a progressive interlocking and disengagement of the opposing fastener elements. The slider may be formed of a single sheet of metal or other material bent into the desired shape (as shown in Figs. 4 and 5), or it may be formed by casting or by any other suitable method. The slider is formed so as to provide two channels 12 and 13, adapted to receive fastener elements 10, separated by a web 22. The inner flanges 14 and 15 of channels 12 and 13 form a triangular camming or guide member 16. The longitudinal marginal portions of flanges 14 and 15 are turned inwardly to form lips 23 and 24, respectively, which serve as guides for the inner edges of the fastener elements. The outer flanges 17 and 18 of channels 12 and 13 grip the fastener elements externally, as shown in Fig. 5. The outer edges of the fastener elements abut and are guided by webs 19 and 20, of channels 12 and 13, respectively. Channels 12 and 13 merge into a single channel 21, as shown in Fig. 4.

Briefly, the operation of the device is as follows: Progressive interlocking of the fastener elements is accomplished by moving slider 11 upwardly, see Fig. 4. Upward motion of slider 11 draws the fastener elements together at an angle and so flexes the edges of the closure material as to space the fastener elements apart sufficiently to permit recess 8 of one element on one edge of the closure material to be placed over tongue 7 of an adjacent element on the opposed edge of the closure material. Progressive disengagement of the fastener elements is accomplished by moving slider 11 downwardly. Downward motion of slider 11 draws the fastener elements apart and so flexes the edges of the closure material so as to permit recess 8 of one element on one edge of the closure material to be withdrawn from tongue 7 of an adjacent element on the opposed edge of the closure material.

Fig. 6 illustrates the use of the fastener elements of Fig. 3 secured to abutting edges of the closure material or stringers. Fastener elements 10 are secured to the abutting edges by placing the edge of the closure material between the adjacent center folds of elements 10 and then applying heat and pressure, as hereinbefore described. Flange 5 is pressed to lie in contact with the adjacent outer fold and forms a guide for slider 30. Slider 30 comprises two channels 31 and 32 which merge into a single channel (not shown), similar to the conventional type of slider. The rear face 33 of the slider is provided with lips 34 which guide the travel of fastener elements 10 by means of flanges 5. The front face 35 of the slider preferably has its marginal portions turned in, as at 36, to maintain the fastener elements in contact with lips 34. The front and rear faces of the slider are connected by a suitable web 37. The operation of the fastener elements is similar to that of the conventional type fastener elements.

Referring to the embodiment of my invention illustrated in Figs. 7, 8 and 9, the fastener elements are formed in a manner similar to that described in connection with fastener element 10 of Fig. 3. However, in the present embodiment, the fastener elements are formed as an integral part of the closure material or stringer. The closure material 40 is impregnated with a suitable plastic material on opposite sides of the proposed location of the opening to form foundation material, as at 41. The fastener element blanks 42 and 43 are then cut from the foundation material, as shown in Fig. 7, leaving staggered blanks projecting from the edges of the closure material.

Blanks 42 and 43 are then folded and the adjacent contacting surfaces bonded to form the completed fastener elements 44 and 45, respectively, in a manner similar to that described in connection with the formation of fastener elements 10 of Fig. 3. Fastener elements 44 and 45 are interlocked and disengaged by means of a slider 46 in a manner similar to that of conventional type fastener elements. In this type of construction, the fastener elements are correctly spaced in their formation and there is no need for any further spacing means, such as means for correctly spacing the fastener elements on the stringers. There is no opportunity for the fastener elements to become separated from the closure material as they are integral therewith.

In the form illustrated in Figs. 10 through 13, the fastener elements comprise a plurality of superimposed blanks. I have illustrated fastener element 50 as consisting of two outer plies 51 and 52 and a center ply 53. The outer plies 51 and 52 are rectangular in shape, as shown in Figs. 10, 11 and 12, and are formed by punching from a sheet of suitable foundation material. The center ply 53 is formed with a tongue 55 on one longitudinal edge and is provided with a complementary recess 54 in the opposite longitudinal edge. Center ply 53 may likewise be formed by punching from a sheet of suitable material. I prefer to bevel tongue 55 and form center ply 53 of material of greater thickness than outer plies 51 and 52, as shown in Fig. 10, in order to increase the ease of operating the separable fastener and to provide a more flexible closure. The lateral width of center ply 53 is somewhat less than that of the outer plies 51 and 52, to provide grooves 56 and 57 which serve to guide a slider (not shown). Outer plies 51 and 52 are formed of suitable foundation material, but it is not necessary to form center ply 53 of the same foundation material. Center ply 53 may be formed of any desired material which may be bonded with or to outer plies 51 and 52.

Fig. 13 illustrates fastener elements 50 secured to the faces of overlapping edges of closure material or stringers 58 and 59. The fastener elements are secured to the closure material or stringers in the same manner as that described hereinbefore in connection with the fastener elements of Figs. 1 through 6. The operation of the fastener elements is also the same as that described hereinbefore in connection with the previously described forms of fastener elements.

Fastener element 60, illustrated in Fig. 14, consists of a plurality of plies, base 61 (see Fig. 15) and head 62 (see Fig. 16). Head 62 is preferably circular in shape, although it may be oval or other convexly curved shape or any other desired shape. The lateral width of base 61 is somewhat less than that of head 62 and is shaped to conform with the shape of the corresponding longitudinal edges of head 62, as shown. However, the longitudinal edges of base 61 may be straight, if desired. The lateral edges of base 61 are provided with recesses 63 and 64 adapted to receive a portion of the head of the adjacent fastener elements of the opposed series of fastener elements when in the interlocked position. These recesses should conform, more or less, to the shape of the lateral edges of the head. Base 61 is of greater thickness than head 62 so as to provide sufficient space between the under surface of the head and the surface of the closure material or stringer, to which the fastener elements are secured, in order to accommodate the slider flanges and the heads of the adjacent fastener elements secured to the opposing stringer when the fastener elements are in an interlocked position (see Fig. 22).

It is apparent that, although base 61 must necessarily be formed of foundation material, head 62 need not be formed of the same material. Head 62 may be formed of any desired material which may be bonded with or to base 61, if desired. The fastener elements are secured to the closure material or stringer by suitable means, as hereinbefore described.

The fastener element 70, illustrated in Fig. 17, consists of a plurality of plies, base 71 (see Fig. 18) and head 72 (see Fig. 19). Head 72 is preferably circular in shape, although it may be any other desired shape, and is provided with circular recesses 73 and 74 in its lateral edges. Base 71 is preferably circular in shape, having a diameter substantially equal to the longitudinal distance between recesses 73 and 74. Recesses 73 and 74 are adapted to receive a portion of base 71 of the adjacent opposed fastener elements when in the interlocked position. It is apparent that base 71 must necessarily be of greater thickness than head 72 and that head 72 need not be formed of foundation material, as described in connection with fastener element 60 of Fig. 14.

The conventional type separable fasteners are marketed in the form of stringer tapes to which the fastener elements are secured. The purchaser obtains a pair of stringers of the desired length and sews the stringers to the opposing free edges of the closure material. I have found that I may secure the fastener elements to a thin strip or tape of cellulose acetate, cellulose nitrate, vinyl plastic, or other suitable material. The purchaser obtains the desired length of tape and secures the tape to the opposing free edges of the closure material without the sewing operation. In order to secure the fastener elements to the closure material, the closure material is saturated with acetone, or other suitable solvent, and the tape is pressed to the saturated material. The solvent in the closure material dissolves a sufficient amount of the tape so as to partially impregnate the closure material with the material of the tape. On evaporation of the solvent, the fastener elements are securely bonded to the closure material. If desired, the closure material may be saturated with a solution of the material of the tape in place of being saturated with the solvent alone. If desired the tape may also be secured to the closure material by the application of heat or heat and pressure without the use of a solvent. In Fig. 20 I have illustrated fastener elements 70 secured to such a tape 75. It is apparent that the hereinbefore described forms of fastener elements may be secured to a tape material in a like manner.

Fig. 21 illustrates fastener elements 70 secured to the faces of overlapping edges of closure material or stringers 76 and 77. As illustrated, the series of fastener elements on stringer 76 are secured to the stringer at points along the edge, while those on stringer 77 are secured at points spaced inwardly from the edge. It is apparent that the fastener elements on both stringers may be secured either along the edge of or spaced inwardly from the stringers, as desired. The fastener elements are secured to the stringers by any suitable method.

In Fig. 22 a closure is illustrated showing a slider 78 adapted to interlock and disengage progressively fastener elements 70. Slider 78 is similar to the conventional type slider and comprises two spaced plates forming two channels 79 and 80 which merge into a single channel 81. The flanges 82 and 83 of rear plate 84 and their cooperating flanges on the front plate (not shown) are guided along the bases 71 of the fastener elements.

Briefly, the operation of this fastener is as follows: As slider 78 is moved upwardly, the fabric is flexed sufficiently so as to bring heads 72 of adjacent opposed fastener elements behind one another and thereby interlock the opposing series of fastener elements. As slider 78 is moved downwardly, the fabric is flexed sufficiently so as to allow disengagement of the fastener elements when the channels 79 and 80 guide the fastener elements in opposite directions. From an inspection of Fig. 22 it is apparent that the thickness of bases 71 of fastener elements 70 must necessarily be greater than the thickness of heads 72. In the interlocked position of the fastener elements, recesses 73 and 74 receive the bases 71 of adjacent opposed fastener elements and prevent lateral motion and consequent disengagement of the fastener elements.

Figs. 23 through 26 illustrate a further embodiment of the fastener elements made in accordance with my invention. Fastener elements 100 and 101 are secured to the edges of closure material or stringers 102 and 103, respectively. Fastener element 100 is grooved on opposite longitudinal sides in such a manner so as to provide a pair of teeth 104 and 105. Fastener 101 is grooved on opposite longitudinal sides in such a manner so as to provide a pair of sockets 106 and 107. Sockets 106 and 107 of fastener elements 101 are adapted to receive teeth 104 and 105, respectively, of adjacent opposed fastener elements 100.

Fastener elements 100 are preferably formed from a single blank 110 (see Fig. 25) of foundation material, but they may be formed of a plurality of blanks superimposed and bonded together, if desired. Blank 110 is formed by cutting spaced, wedge-shaped grooves 111, 112, 113 and 114 and then folding the blank upon itself. The blank may be scored, as at 115, to aid in folding and to insure proper folding of the blank. After folding, stringer 102 is placed between the folds or plies and the adjacent contacting plies are bonded and the fastener elements are secured to the stringer by the application of heat and pressure, or by other suitable means dependent upon the type of foundation material used, as hereinbefore described. Fastener element 101 is formed and secured to the stringer in a like manner from a blank 116 (see Fig. 26). Blank 116 may be scored, as at 117, to aid in folding and to insure proper folding of the blank.

Figs. 27 and 28 illustrate fastener elements formed integral with the closure material or stringer. These elements are formed in a manner similar to that described in connection with Figs. 7, 8 and 9. The closure material 120 is impregnated with a suitable plastic material to form foundation material, as at 121. Fastener element blanks 122 and 123 are cut from the foundation material, leaving staggered blanks projecting toward each other from the edges of the closure material. Blanks 122 and 123 are then folded and the adjacent contacting surfaces bonded to form the completed fastener elements 124 and 125, respectively.

Figs. 29 through 33 illustrate a modification of the fastener elements of Fig. 23. Fastener elements 130 are provided with a tooth 131 on one longitudinal side and a socket 132 in the opposite longitudinal side. In the interlocked position (see Fig. 33), socket 132 of one fastener element receives tooth 131 of the adjacent opposed fastener element. Fastener elements 130 are formed of two complementary blanks 133 and 134 (see Figs. 31 and 32). Each blank is formed with a pair of wedge-shaped grooves 135 and 136 in the opposite longitudinal edges of the blank. The inner lateral boundary faces 137 and 138 of the grooves are at substantially right angles to the plane of the blank. The outer lateral boundary faces 139 and 140 form acute angles with the plane of the blank. Face 139 slopes downwardly to the left and face 140 slopes downwardly to the right. In order to mount fastener element 130 on the stringer 141, the edge portion of the stringer is placed between blanks 133 and 134 and the contacting surfaces of the blanks are bonded and the fastener elements secured to the stringer by the application of heat and pressure, or by other suitable means dependent upon the type of foundation material used, as hereinbefore described. Socket 132 may be formed so that the angle between its faces is somewhat greater than the angle between the faces of tooth 131. This provides for a more flexible closure.

Briefly, the operation of the device is as follows: Progressive interlocking of the opposed series of fastener elements is accomplished by moving slider 145 upwardly. Upward motion of slider 145 draws the fastener elements together at an angle and so flexes the edges of the closure material or stringers as to space the heads of the fastener elements apart sufficiently to permit the socket 132 of one element to be placed over the tooth 131 of an adjacent opposed element. Progressive disengagement of the opposed series of fastener elements is accomplished by moving slider 145 downwardly. Downward motion of slider 145 draws the fastener elements apart and so flexes the edges of the closure material as to space the heads of the fastener elements apart to permit the socket 132 of one element to be withdrawn from the tooth of an adjacent opposed element.

It is to be understood that the foregoing description is merely illustrative of my invention and that various modifications may be made without departing from the scope of my invention. For example, although I have described the fastener elements as being made from a plurality of blanks cut from sheet material, it is apparent that the blanks may be formed by a casting or molding operation or process. Although I have illustrated and described triangular teeth and sockets, they may be rounded.

The term "longitudinal" is used herein to designate the direction of the series of fastener elements or the direction of the edge of the closure material or stringer. The term "lateral" is used herein to designate the direction at right angles to the longitudinal direction. These terms and the terms "top" and "bottom", and other like terms, are used herein in a relative sense so as to simplify the description and claims and are not used as limitations.

Reference is made to my copending application S. N. 250,180, filed January 10, 1939, as a continuation in part of my abandoned applications S. N. 71,011, filed March 26, 1936, and S. N. 136,754, filed April 14, 1937. Portions of the disclosure not claimed herein are claimed in my application S. N. 250,180, filed January 10, 1939.

I claim:

1. A multiple operated fastener of the class described comprising cooperating series of fastener elements on opposite sides of the fastener, each fastener element comprising a two-ply structure, each ply consisting of a flat piece notched at the opposite sides intermediate the ends of the piece dividing the flat piece into a base portion and a head portion, the walls of the notches adjacent the head portion forming an acute angle with the widest surface of the flat piece, such angle on one piece having an inclination opposite to that on the other piece to form a V-shaped recess.

2. A multiple operated fastener of the class described comprising cooperating series of fastener elements on opposite sides of the fastener, each fastener element comprising a two-ply structure, each ply consisting of a flat piece notched at the opposite sides intermediate the ends of the piece dividing the flat piece into a base portion and a head portion, the walls of the notches adjacent the head portion forming an acute angle with the widest surface of the flat piece, the incline of the wall on one of said notches being opposite in direction to the incline of the wall of the other of said notches in each piece, and the other piece having similar inclined walls but the mating walls having opposite inclinations so that a V-shaped recess is formed on one side of the fastener member and a V-shaped projection is formed on the opposite side of the fastener member to cooperate with similar recesses and projections of corresponding fastener members on the opposite side of the fastener.

SVERRE QUISLING.